US009175600B2

(12) United States Patent
Park

(10) Patent No.: US 9,175,600 B2
(45) Date of Patent: Nov. 3, 2015

(54) SYSTEM AND METHOD FOR PROTECTING AN ENGINE FROM CONDENSATION AT INTAKE

(75) Inventor: Deokkyu Park, Naperville, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 14/240,482

(22) PCT Filed: Aug. 23, 2011

(86) PCT No.: PCT/US2011/048742
§ 371 (c)(1),
(2), (4) Date: Feb. 24, 2014

(87) PCT Pub. No.: WO2013/028173
PCT Pub. Date: Feb. 28, 2013

(65) Prior Publication Data
US 2014/0208738 A1    Jul. 31, 2014

(51) Int. Cl.
F02B 29/04      (2006.01)
F02B 47/08      (2006.01)
F01K 23/06      (2006.01)
F01K 25/10      (2006.01)
F02M 25/07      (2006.01)
F01N 5/02       (2006.01)
F02G 5/02       (2006.01)

(52) U.S. Cl.
CPC ............... *F02B 47/08* (2013.01); *F01K 23/065* (2013.01); *F01K 25/10* (2013.01); *F01N 5/02* (2013.01); *F02G 5/02* (2013.01); *F02M 25/0711* (2013.01); *F02M 25/0738* (2013.01); *F02M 25/0742* (2013.01); *Y02T 10/121* (2013.01); *Y02T 10/16* (2013.01); *Y02T 10/166* (2013.01)

(58) Field of Classification Search
CPC ........... F02M 25/0715; F02M 25/0738; Y02T 10/121; Y02T 10/16
See application file for complete search history.

(56) References Cited

U.S. PATENT DOCUMENTS

| 5,732,688 | A   | * | 3/1998  | Charlton et al. | 123/568.12 |
| 8,776,517 | B2  | * | 7/2014  | Ernst et al.    | 60/616     |
| 2005/0028796 | A1 | * | 2/2005  | Tussing et al.  | 123/568.22 |
| 2005/0262842 | A1 | * | 12/2005 | Claassen et al. | 60/618     |
| 2009/0050117 | A1 | * | 2/2009  | Tai et al.      | 123/542    |
| 2009/0211253 | A1 | * | 8/2009  | Radcliff et al. | 60/670     |
| 2009/0241543 | A1 | * | 10/2009 | Ernst           | 60/645     |
| 2009/0277173 | A1 | * | 11/2009 | Ernst et al.    | 60/616     |

(Continued)

*Primary Examiner* — Jesse Bogue
(74) *Attorney, Agent, or Firm* — Jeffrey P. Calfa; Mark C. Bach

(57) ABSTRACT

An engine protection system and methods for preventing intake condensation are disclosed. In a system and various of the methods, an exhaust gas recirculation (EGR) valve is positioned within an EGR passage fluidly connecting an engine exhaust stream and an engine intake stream, while a waste heat recovery (WHR) system is used to recover heat from the EGR stream. An engine control unit (ECU) is coupled to various sensors and valves to divert working fluid from the WHR system from cooling the EGR exhaust flow below a level which favors production of condensation in the engine intake system. The ECU operates to divert working fluid flow when sensors indicate characteristics of either the exhaust flow or the intake stream which might lead to heavy condensation. A three-way valve is also used to divert the working fluid to a variable expansion valve fluidly coupled to the three-way valve in response to a signal from one of the sensors to prevent damage to the system turbine.

11 Claims, 2 Drawing Sheets

(56) References Cited

U.S. PATENT DOCUMENTS

| | | |
|---|---|---|
| 2011/0079002 A1 | 4/2011 | Siuchta |
| 2011/0099988 A1 | 5/2011 | Pellico |
| 2011/0185991 A1* | 8/2011 | Sheidler et al. ............ 123/41.09 |
| 2012/0042650 A1* | 2/2012 | Ernst et al. ...................... 60/615 |
| 2012/0216762 A1* | 8/2012 | Ernst et al. ................. 123/41.21 |
| 2012/0279204 A1* | 11/2012 | Berger et al. .................... 60/278 |
| 2013/0186087 A1* | 7/2013 | Gibble et al. ................... 60/615 |

* cited by examiner

SYSTEM AND METHOD FOR PROTECTING AN ENGINE FROM CONDENSATION AT INTAKE

TECHNICAL FIELD

The present device relates to system and methods which reduce condensation production at an engine intake. Particularly, the system and methods relate to control of a exhaust gas recirculation waste heat recovery (EGR WHR) system used to prevent condensation at the engine intake, such as the intake manifold.

BACKGROUND

In internal combustion engines, when the combustion temperatures exceed about 2,500° F. (about 1,371° C.), atmospheric nitrogen begins to react with intake oxygen to form compounds called nitrogen oxides (NOx). These compounds play a major role in air pollution, particularly in high traffic areas such as cities. To reduce the formation of NOx, combustion temperatures must be kept below the 2,500° F. threshold. One way this is achieved is by re-circulating a small amount of engine exhaust back into the engine intake through an exhaust gas recirculation (EGR) valve.

The EGR valve controls a passageway between the intake and exhaust manifolds. Sensors and a control unit are used to open the valve to allow the intake vacuum to draw exhaust through the valve and into the intake stream. The exhaust gas dilutes the incoming air/fuel mixture and has a quenching effect on combustion temperatures, which keeps NOx production within acceptable limits. As an added benefit, it also reduces the engine's octane requirements which lessens the occurrence of detonation (spark knock).

However, when a waste heat recovery system is also used to recover energy from the exhaust flow before it enters the intake side, condensation formation at the engine intake can pose other problems. Condensation on the intake system may damage the engine by breaking down oil film on engine cylinder surfaces and clogging intake ports by combining with combustion soot to form wet soot deposits. The main cause of the condensation is an EGR out temperature which is too low as a result of the temperature of the working fluid in the WHR being much lower than the engine coolant temperature.

The disclosed system and methods address these problems in the prior art by providing protection against condensation production. The system provides means for protecting against cooling the EGR stream beyond a threshold which would cause condensation. Likewise, the methods provide for protecting an engine from damage due to heavy condensation at the intake system.

SUMMARY

An engine protection system for preventing intake condensation is disclosed. The system comprises an exhaust gas recirculation (EGR) valve positioned within an EGR passage fluidly connecting an engine exhaust stream and an engine intake stream, a super heater fluidly coupled by an inlet and an outlet to the EGR passage after the EGR valve, a boiler fluidly coupled by an inlet to the super heater and by an outlet to the EGR passage, a first sensor for determining a characteristic of the engine intake stream, a waste heat recovery (WHR) system for recovering heat from an EGR stream passing through the EGR passage and a engine control unit (ECU).

In an embodiment of the system, the WHR system comprises a fluid loop including a fluid pump continuously circulating a working fluid from an outlet end of the pump to an inlet end of the pump, wherein the loop passes into and out of the boiler and then into and out of the super heater, a condenser coupled to the fluid loop, a turbine coupled to the fluid loop, a recuperator coupled to the fluid loop, and a bypass valve coupled to the fluid loop for diverting the working fluid away from the boiler and the super heater.

In an embodiment of the system, the ECU is electronically coupled to the first sensor and the bypass valve and opens the bypass valve in response to a signal from the first sensor. The first sensor may be one of either a temperature sensor or a pressure sensor and the signal is a temperature or pressure, respectively, of the engine intake stream.

In an embodiment of the system, the WHR system further comprises a three-way valve coupled to the fluid loop at a position after the super heater and before the turbine. Preferably, the three-way valve is electronically coupled to the controller. A second sensor for determining a state of the working fluid before it enters the turbine may be used, the second sensor also being electronically coupled to the controller. The controller diverts the working fluid to a variable expansion valve fluidly coupled to the three-way valve in response to a signal from one of either the first sensor or the second sensor.

A method of protecting an engine from condensation damage is also disclosed. Generally speaking, the method comprises the steps of opening an EGR valve to divert an exhaust flow from a portion of an engine exhaust stream through an EGR passage, directing the exhaust flow through a super heater and a boiler coupled to the EGR passage, pumping a working fluid through a waste heat recovery (WHR) system fluid loop thermally coupled to the EGR passage, exchanging heat between the exhaust flow and the working fluid as the two pass through the boiler and the super heater to cool the exhaust flow, introducing the cooled exhaust flow into an engine intake stream, determining characteristics of the engine intake stream, and diverting the working fluid to bypass the boiler and super heater when the characteristics of the engine intake stream are favorable to production of condensation.

These and other embodiments of the system may be more readily understood with reference to the following description and the appended drawings.

DETAILED DESCRIPTION

Figure 1:
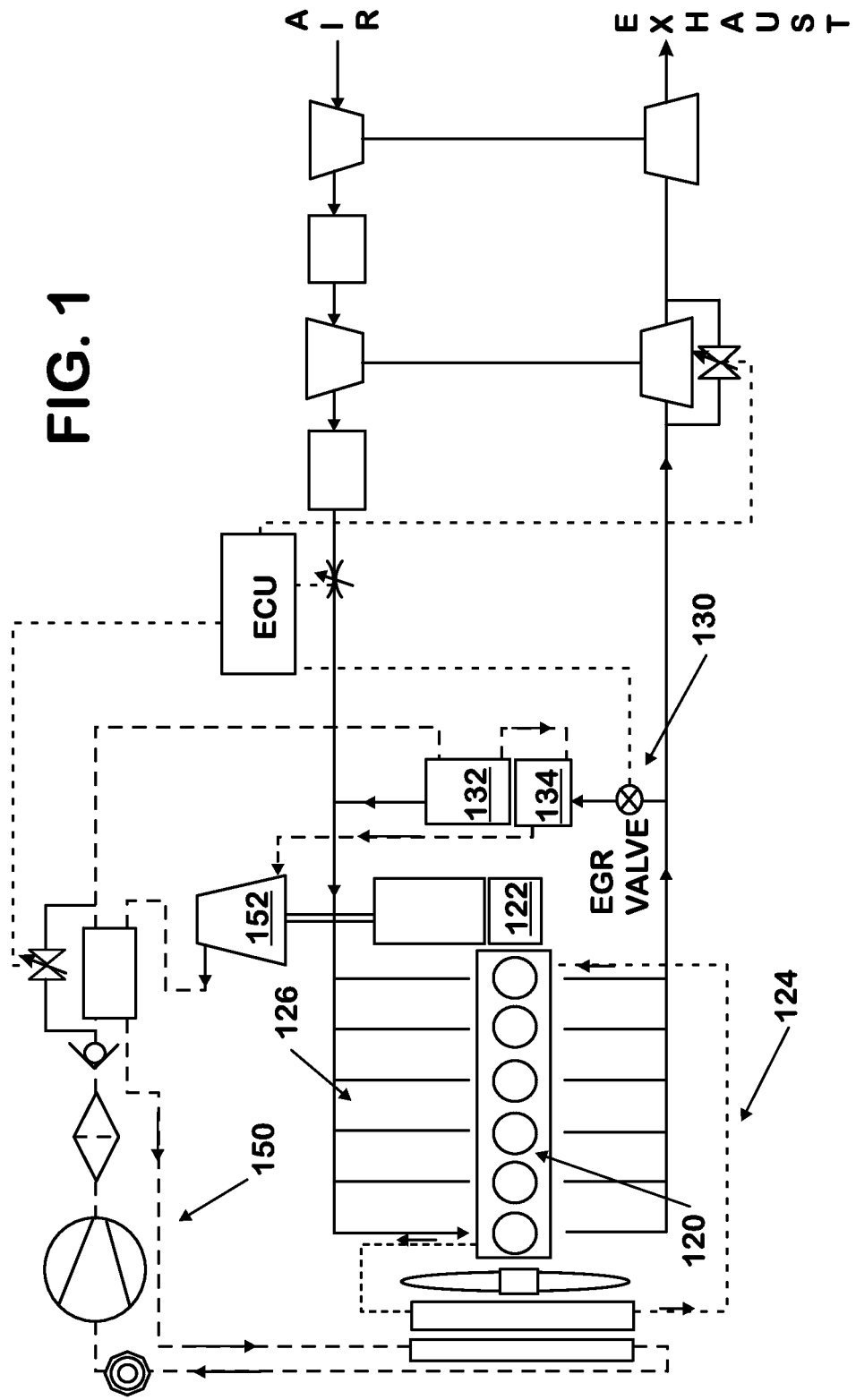
FIG. 1 is a schematic of a engine system having an EGR system and a WHR system.

Generally speaking, and with reference to the schematic of FIG. 1, an engine 120 operates to drive a transmission 122 which turns a drive shaft coupled to wheels and ultimately propels a vehicle. The engine 120 is kept within a desired temperature operating range by a cooling system 124. However, engine combustion may cause engine chambers to exceed a 2500° F. threshold temperature at which the production of nitrogen oxides (NOx) reaches an unsatisfactory level. As a means for preventing the production of NOx, an EGR system 130 is employed. As a means for utilizing some of the energy from the heat expelled by the EGR system 130, a WHR system 150 recovers heat from the exhaust flow through the boiler 132 and the super heater 134 and then uses the energy to drive a turbine 152. However, conditions may exist in the intake system 126 such that the cooler EGR exhaust flow creates heavy condensation, potentially damaging to engine components.

Accordingly, the present system 10 operates to protect an intake system from such condensation production.

Figure 2:
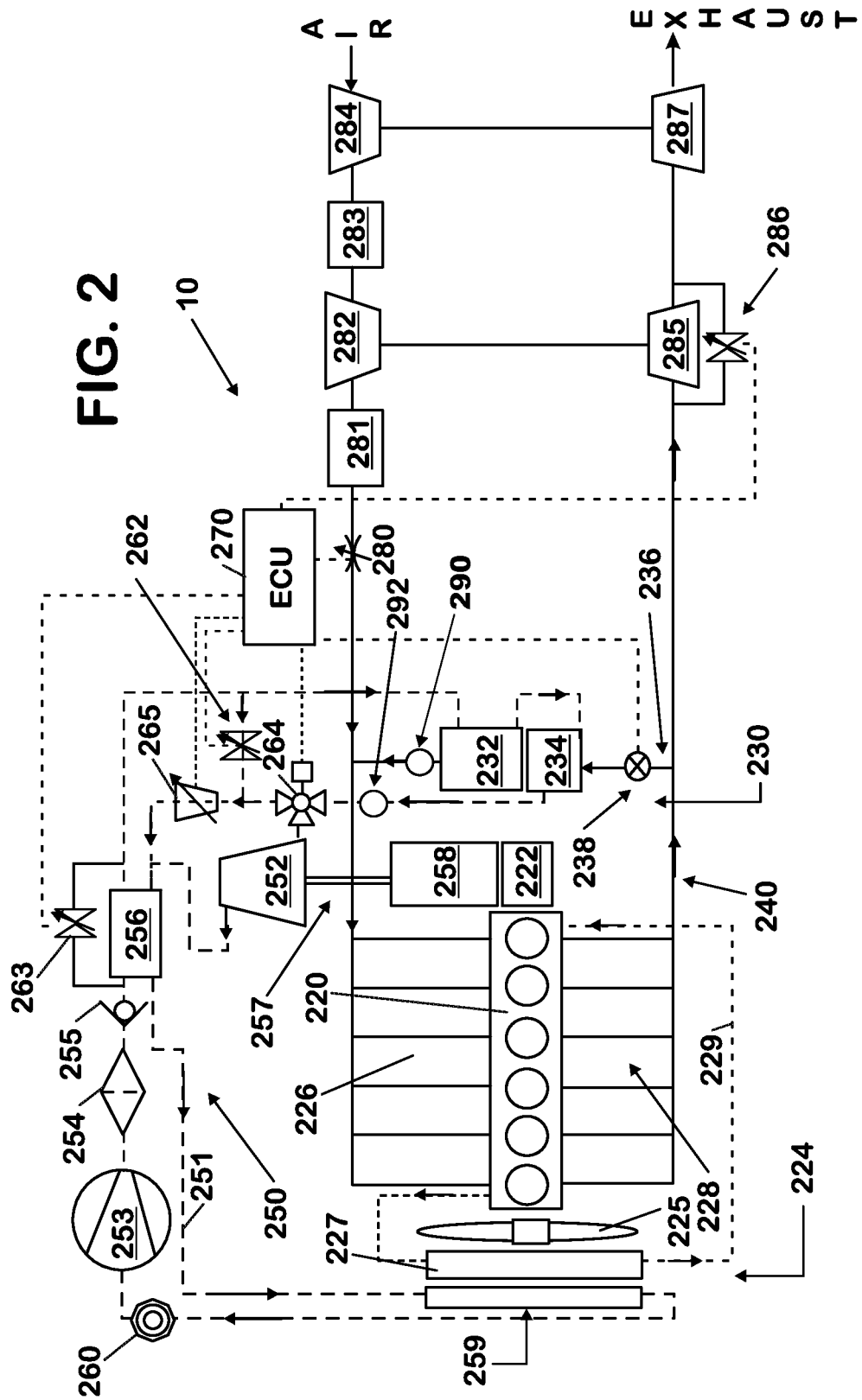
FIG. 2 is a schematic of an embodiment of the engine protection system in accordance with the present disclosure.

With reference to FIG. 2, an embodiment of the system 10 can be seen to comprise an engine 220 coupled to a transmission 222 and having a cooling system 224 comprised of a fan 225, radiator 227 and coolant loop 229 for maintaining a desired operating temperature range in the engine 220. The engine 220 also includes an intake system 226 and an exhaust system 228, as well as an exhaust gas recirculation (EGR) system 230 and a waste heat recovery (WHR) system 250. The EGR system 230 creates an exhaust flow by diverting a portion of the engine exhaust stream 240 into a passage 236 with the opening of an EGR valve 238. The passage 240 connects at a discharge end to the engine intake system 226. Within the EGR passage 236, a super heater 234 and a boiler 232 are used to cool the exhaust flow through the passage 236 before introducing the flow into the intake system 226.

As for the WHR system 250, the following components are fluidly connected by a loop 251 of working fluid, preferably refrigerant: pump 253, filter 254, check valve 255, recuperator 256, turbine 252 connected by a drive shaft 257 to a torque converter 258, condenser 259, and sight glass 260. A bypass valve 262 is added before the loop 251 enters the boiler 232, to divert working fluid from the high-side to the low side without passing through the EGR system 230. Additionally, the recuperator 256 includes a bypass valve 263, and a three-way valve 264 is used to bypass the turbine 252 in favor of a variable expansion valve 265 during certain operating conditions.

Finally, an engine control unit (ECU) 270 is electronically coupled to and controls operation of the EGR valve 238, the three-way valve 264, the bypass valve 262, the expansion valve 265 and the recuperator bypass valve 263. Other components of the exhaust system 228 and intake system 226 include intake throttle 280, HP-CAC 281, HP-compressor 282, LP-CAC 283, LP-compressor 284, HP-turbine 285 with a bypass valve 286, and LP-turbine 287.

In the present system 10, a portion of the engine exhaust gas stream 240 is routed into an EGR passage 236 through the super heater 234 and the boiler 232 into the intake system 226 of the engine 220 by opening the EGR valve 238. Heat from the exhaust flow transfers into the working fluid (refrigerant) in the WHR system 250 through the super heater 234 and the boiler 232. The pressure of vaporization of the hot working fluid is dramatically decreased through the turbine 252 while still in the vapor phase.

Unlike prior systems, however, if the temperature of the hot exhaust flow is too high, as determined by a first sensor 290 feeding information to the ECU 270, or if the working fluid state is not in the vapor phase as it reaches the turbine inlet, also as determined by a second sensor 292 feeding information to the ECU 270, then the working fluid is diverted to pass through the variable expansion valve 265 to protect the turbine 252. The noted sensors 290, 292 feed information to the ECU 270 related to characteristics (e.g., temperature, pressure) of the exhaust flow and the working fluid and, when dictated, the ECU 270 opens a bypass line 267 of the three-way valve 264 and closes a line 268 of the three-way valve 264 to the turbine 252.

Whether the low-pressure, hot gas passes through the turbine 252 or is diverted through the variable expansion valve 265, it then passes through the recuperator 256 to reduce the working fluid temperature on the condenser 259. After the working fluid is cooled by the recuperator 256, it enters into the condenser 259 to return fully to liquid phase. In the liquid phase, the working fluid can be more readily handled without damaging other system components. The fully sub-cooled fluid passes through the sight glass 260 and into the pump 253. The pump 253 is used to control the amount of working fluid in the WHR system 250. From the pump 253, the fluid passes through a filter 254, a check valve 255, the recuperator 256 again—the high-side fluid picks up heat from the low-side fluid returning to the condenser 259—the boiler 232, and then the super heater 234. In passing through the latter two components, as described above, the working fluid picks up waste heat and is changed to vapor form.

Much like the three-way valve 264 described above, the bypass valve 262 is controlled by real-time signals from the ECU 270. Preferably, the signals for the bypass valve 262 are based on boiler outlet temperature or the amount of condensation on the intake system 226. Sensors 290, 292, either temperature or pressure, are used to feed information to the ECU 270 about the characteristics of the boiler outlet flow and/or the intake system flow. The bypass valve 262 controls working fluid amounts through the boiler 232 and the super heater 234 by bypassing working fluid from the high-pressure side to the low-pressure side, as illustrated in FIG. 2. Working fluid which is bypassed through the bypass valve 262 enters the variable expansion valve 265 where it expands.

By bypassing working fluid through the bypass valve 262, the boiler outlet temperature is controlled by real-time control of the amount of working fluid passing through the boiler 232 and the super heater 234 of the EGR system 230. The ability to bypass the boiler 232 and the super heater 234 allows careful control of the temperature of the EGR exhaust flow entering the intake system 226 to prevent condensation production.

Further, for safety purposes, when using the described system 10, the highest temperature on the WHR system 250 should be maintained to avoid breakdown of the working fluid.

What is claimed is:

1. An engine protection system for preventing intake condensation, the system comprising:
    an exhaust gas recirculation (EGR) valve positioned within an EGR passage fluidly connecting an engine exhaust stream and an engine intake stream;
    a super heater fluidly coupled by an inlet and an outlet to the EGR passage after the EGR valve;
    a boiler fluidly coupled by an inlet to the super heater and by an outlet to the EGR passage;
    a first temperature sensor for determining a temperature of the engine intake stream;
    a waste heat recovery (WHR) system for recovering heat from an EGR stream passing through the EGR passage, the WHR system comprising:
    a fluid loop including a fluid pump continuously circulating a working fluid from an outlet end of the pump to an inlet end of the pump, wherein
    the loop passes into and out of the boiler and then into and out of the super heater;
    a condenser coupled to the fluid loop;
    a turbine coupled to the fluid loop;
    a recuperator coupled to the fluid loop;
    a three-way valve coupled to the fluid loop to a position after the super heater and before the turbine;
    a bypass valve coupled to the fluid loop for diverting the working fluid away from the boiler and the super heater; and a controller electronically coupled to the first temperature sensor, the three-way valve and the bypass valve, wherein the controller opens the bypass valve in response to a temperature signal from the first temperature sensor, and wherein;

the controller diverts the working fluid to a variable expansion valve fluidly coupled to the three-way valve in response to a temperature signal from the first temperature sensor.

2. The engine protection system of claim 1, wherein the controller is electronically coupled to the EGR valve.

3. An engine protection system for preventing intake condensation, the system comprising:

an exhaust gas recirculation (EGR) valve positioned within an EGR passage fluidly connecting an engine exhaust stream and an engine intake stream;

a super heater fluidly coupled by an inlet and an outlet to the EGR passage after the EGR valve;

a boiler fluidly coupled by an inlet to the super heater and by an outlet to the EGR passage;

a first sensor for determining a characteristic of the engine intake stream;

a waste heat recovery (WHR) system for recovering heat from an EGR stream passing through the EGR passage, the WHR system comprising:

a fluid loop including a fluid pump continuously circulating a working fluid from an outlet end of the pump to an inlet end of the pump, wherein the loop passes into and out of the boiler and then into and out of the super heater;

a condenser coupled to the fluid loop;

a turbine coupled to the fluid loop;

a recuperator coupled to the fluid loop; and a bypass valve coupled to the fluid loop for diverting the working fluid away from the boiler and the super heater;

a three-way valve coupled to the fluid loop at a position after the super heater and before the turbine; and a controller electronically coupled to the first sensor, the bypass valve and the three-way valve, wherein the controller opens the bypass valve in response to a signal from the first sensor and wherein;

the controller diverts the working fluid to a variable expansion valve fluidly coupled to the three-way valve in response to a signal from the first sensor.

4. The engine protection system of claim 3, wherein the first sensor is a pressure sensor and the signal is a pressure of the engine intake stream.

5. An engine protection system for preventing intake condensation, the system comprising:

an exhaust gas recirculation (EGR) valve positioned within an EGR passage fluidly connecting an engine exhaust stream and an engine intake stream;

a super heater fluidly coupled by an inlet and an outlet to the EGR passage after the EGR valve;

a boiler fluidly coupled by an inlet to the super heater and by an outlet to the EGR passage;

a first sensor for determining a characteristic of the engine intake stream;

a waste heat recovery (WHR) system for recovering heat from an EGR stream passing through the EGR passage, the WHR system comprising:

a fluid loop including a fluid pump continuously circulating a working fluid from an outlet end of the pump to an inlet end of the pump, wherein the loop passes into and out of the boiler and then into and out of the super heater;

a condenser coupled to the fluid loop;

a turbine coupled to the fluid loop;

a recuperator coupled to the fluid loop;

a three-way valve coupled to the fluid loop at a position after the super heater and before the turbine;

a second sensor for determining a state of the working fluid before it enters the turbine; and a bypass valve coupled to the fluid loop for diverting the working fluid away from the boiler and the super heater; and a controller electronically coupled to the first sensor, the three-way valve, the second sensor and the bypass valve, wherein the controller opens the bypass valve in response to a signal from the first sensor and the controller diverts the working fluid to a variable expansion valve fluidly coupled to the three-way valve in response to a signal from one of either the first sensor or the second sensor.

6. A method of protecting an engine from condensation damage comprising the steps of:

opening an EGR valve to divert an exhaust flow from a portion of an engine exhaust stream through an EGR passage;

directing the exhaust flow through a super heater and a boiler coupled to the EGR passage;

pumping a working fluid through a waste heat recovery (WHR) system fluid loop thermally coupled to the EGR passage;

exchanging heat between the exhaust flow and the working fluid as the two pass through the boiler and the super heater to cool the exhaust flow;

introducing the cooled exhaust flow into an engine intake stream;

determining the characteristics of the engine intake stream; and diverting the working fluid to bypass the boiler and super heater when the characteristics of the engine intake stream are favorable to production of condensation and wherein the step of determining characteristics of the engine intake stream comprises the step of sensing the stream condensation level.

7. The method of claim 6, wherein the step of diverting the working fluid comprises the step of opening a bypass valve bridging a high-side and a low-side of the fluid loop.

8. The method of claim 7, wherein the step of opening a bypass valve is performed by an engine control unit.

9. The method of claim 6, further comprising the step of diverting working fluid around a turbine in the WHR system.

10. The method of claim 9, wherein the step of diverting working fluid around a turbine comprises the step of opening a bypass line in a three-way valve and closing a first line in the three-way valve.

11. The method of claim 10, wherein the three-way valve is controlled by an engine control unit.

* * * * *